E. A. DE WOLF.
COIL FOR ELECTRICAL PURPOSES AND METHOD OF PRODUCING SAME.
APPLICATION FILED APR. 15, 1913.

1,091,046.

Patented Mar. 24, 1914.
2 SHEETS—SHEET 1.

UNITED STATES PATENT OFFICE.

ERNEST A. DE WOLF, OF MANSFIELD, MASSACHUSETTS, ASSIGNOR TO JOSEPH ROBERT LEESON, OF BOSTON, MASSACHUSETTS.

COIL FOR ELECTRICAL PURPOSES AND METHOD OF PRODUCING SAME.

1,091,046.   Specification of Letters Patent.   Patented Mar. 24, 1914.

Application filed April 15, 1913. Serial No. 761,286.

*To all whom it may concern:*

Be it known that I, ERNEST A. DE WOLF, a citizen of the United States, residing at Mansfield, in the county of Bristol and Commonwealth of Massachusetts, have invented certain new and useful Improvements in Coils for Electrical Purposes and Methods of Producing Same, of which the following is a specification.

My invention relates to coils for electrical purposes, such as magnet and resistance coils, and to an improved method of producing the same.

It consists particularly of a novel system of winding wire or other conducting material in layers of adjacent helices and simultaneously winding insulating material, such as yarn or thread, contiguous the ends of the wire layers to build up abutments for holding the wire windings from displacement and to provide protecting heads or flanges at the ends of the coil.

The object of my improvement is to dispense with the usual spool or support on which electrical coils are commonly wound, while at the same time producing a finished coil in which the convolutions are properly disposed and securely held in exact relation to each other and so protected at the ends that the windings will not be displaced in handling or through rough usage.

The invention is fully described in the following specification, illustrated by the accompanying drawings, in which like letters of reference designate like parts.

Figure 1:
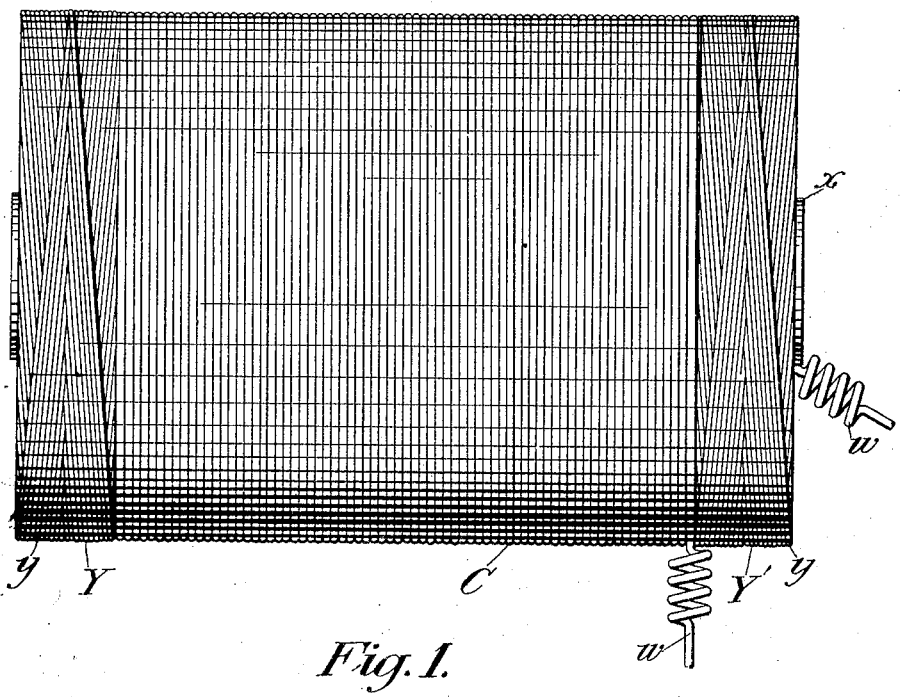
Figure 2:
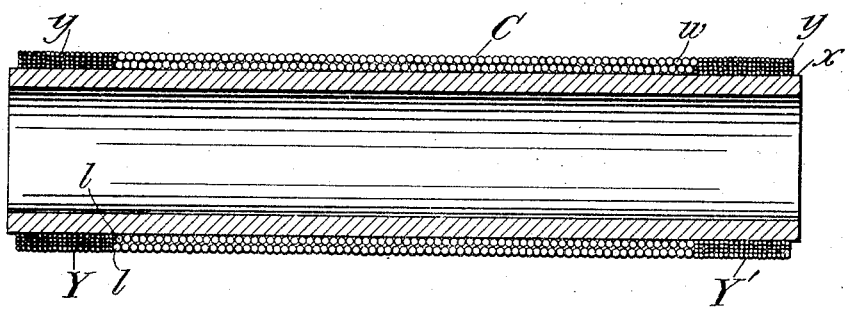
Figures 3, 4:
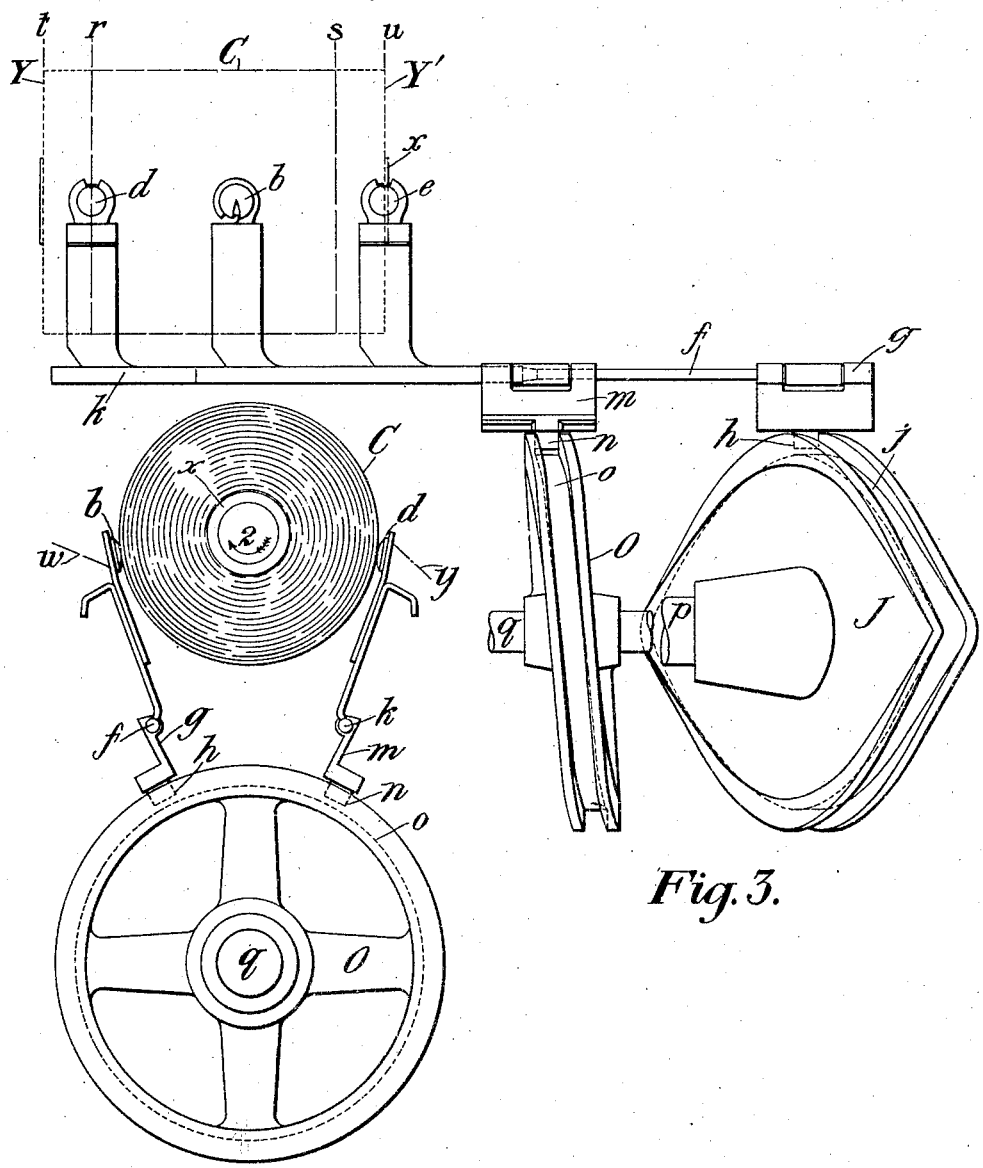

In the drawings: Figure 1 is a side elevation of my improved coil; Fig. 2 is a longitudinal, sectional view of the tube or core on which the coil is wound, showing a few layers of windings in place; Fig. 3 is an elevation of a portion of the winding device used for winding the coils, showing the arrangement and relation of the winding-guides and their reciprocating means; Fig. 4 is an end elevation of the same.

It is the usual practice in winding electrical coils to build the wire up on spools or similar supporting means having end heads or flanges which are designed to hold the windings from displacement and prevent the convolutions from drawing down or falling over the ends of the coil. In winding coils by hand it is a comparatively simple matter to guide the windings or convolutions of the wire close up to the inner faces of the spool flanges before leading them back in the reverse helices. For various reasons, however, such as economy in cost of production and greater accuracy and precision in laying the turns of wire, it has been found expedient to produce the coils by mechanical means rather than through manual operations. In winding coils by machine one difficulty encountered has been to provide a guiding device which will direct the wire close up to the supporting heads at the ends of the spool. In order to make the guiding device effective for the precise laying of the coils it is necessary that its delivery point be maintained close to the surface on which the windings are being deposited. Now, since the guide must have a width or thickness materially greater than the thickness of the wire, it is obvious that it cannot be arranged to reciprocate between the heads of the spool without a clearance at each end which renders it practically impossible to lay the wire close up against the inside faces of the heads.

Another obstacle to the accomplishment of perfect winding by machine arises from the lack of uniformity in thickness or diameter of the wire employed and variations in the length of the spools. It is a well known fact that insulated wire cannot be made in long lengths of absolutely uniform diameter and, furthermore, it is practically impossible in manufacturing the coil-supporting spools in quantity to make them uniformly of the same length between the heads. Owing to this variation in diameter of the wire the different layers in the coil cannot be made of uniform length when they are wound with the same number of turns in each layer, which is necessary in mechanically-controlled winding. In addition to this, the variations in the length of the spools cause further discrepancies as regards regulating the length of the wire layers to correspond exactly with the distance between the spool heads. For these reasons it is practically impossible to adjust the winding so that the ends of all of the layers will come exactly flush with the inner faces of the spool heads to provide for their being supported thereby; consequently, some of the benefit for which the spool is designed is lost. Where the length of the layer is shorter than the distance between the spool heads the individual convolutions of wire are liable to separate or spread out and in some cases the spaces between the turns will be so wide that the windings of subsequent layers, wound on top, will be forced down into the interstices to cause defects in the completed coil. Where the windings tend to fill a longer space than that allowed between the spool heads the convolutions or turns of the wire will be crowded so that they "pile" one on another and this also results in uneven layers and irregularities in the winding which act to diminish, and in some cases to entirely destroy, the electrical efficiency of the coil. Various expedients have been devised to overcome these difficulties, but so far these have not been entirely successful and it is a difficult matter at the present time to wind perfect coils by machine. In some cases the guide for the wire has been arranged to reciprocate in a path outside the edges of the heads of the spool, but this method is open to serious defects, particularly in winding coils of large diameter. Under these conditions, the delivery point of the guide being a considerable distance from the core on which the first layers of windings are deposited, it is almost impossible to control the disposition of the turns accurately and at some points they will be too far separated while at others the windings may "pile" on each other and form ridges and hollows. It is most important that the turns or convolutions of the coil be accurately and precisely laid in relation to each other as otherwise the inductive and conductive effect of the current is interfered with or entirely lost, and hence the electrical efficiency of the coil is impaired. Frequently this efficiency may be entirely destroyed and it is often necessary to discard the completed coil owing to a single defect in the winding.

In my present invention I propose to build up the supporting and protecting flanges at the ends of the coil coincident and concurrently with the building up of the layers of wire windings. That is to say, during the winding of each layer of wire I effect a simultaneous winding of insulating material, such as thread or yarn, to build up a mass of the same thickness closely abutting the ends of the wire layer. The winding proceeds in this way until the desired diameter is reached and when the coil is completed it will have two opposite abutments consisting essentially of disk-like formations of yarn supporting and protecting its ends. These abutments, being of relatively soft, resilient material, are adapted to conform to irregularities in the ends of the wire layers and hence they are more effective for the purpose designed than the usual rigid spool heads. That is to say, the layers of yarn or other supporting windings are elastic to a considerable extent and adapt themselves to the more rigid wire windings so as to fill up all interstices at the ends of the coil and provide a self-sustaining, self-conforming abutment, corresponding exactly with the ends of the layers of wire windings. To make the abutments more stable and permanent they may be coated with shellac, glue or other plastic material, or immersed in a bath of plastic rubber or cement which solidifies the structure and amalgamates the yarn windings with the wire windings.

The manner of carrying out my invention is as follows: Referring to the drawings, the coil C is preferably wound on a tube $x$ of paper, fiber or other similar material, or it might be built up on any suitable core, either of cylindrical, polygonal or other form. The wire $w$ is laid with the usual "spool wind" having the turns or helices disposed closely adjacent each other and built up in layers $l$, $l$, etc., as shown most clearly in Fig. 2. During the winding of the wire I simultaneously effect the winding of the yarn $y$ at both ends of the coil with the yarn layers building up in the same ratio as the wire windings. In order to insure that the yarn may be built up in self-sustaining disk-like formations having substantially flat ends, I preferably employ the well-known "universal" or V-wind system for this portion of the coil. This method of winding results in a very stanch and stable structure even when the yarn is wound with a relatively short traverse. As illustrated in the drawings the end abutments of the coil, which are virtually narrow, disk-like cops of yarn or thread, have a thickness, taken longitudinally of their axis, of about one-sixth the length of the wire layers. That is to say, the two end abutments of yarn windings occupy about one-fourth the whole length of the coil, but these proportions are not arbitrary and can be varied to suit different conditions. For instance, in a coil of less diameter, where there would be less constrictive tendency of the windings and less liability of the wire convolutions becoming misplaced or disarranged, the yarn disks at the ends of the coil could be made thinner.

In order to make the system of winding my improved coil more readily understood I have shown the essential elements of the winding apparatus or machine in Figs. 3 and 4 of the drawings. Referring thereto, $b$ designates the guide for the wire $w$, and $d$ and $e$ the guides for the thread or yarn $y$. The wire-guide $b$ is mounted at the end of a traverse-rod $f$ which carries a slide or runner $g$ at its opposite end having a stud or roll $h$ projecting from its under side to engage the groove $j$ in the traverse-cam $J$. The yarn-guides $d$ and $e$ are both mounted on a traverse-rod $k$ at a distance apart equal to the length of traverse of the guide $b$. The rod $k$ carries a slide $m$ provided with a roll or stud $n$ which engages the groove $o$ in the traverse-cam O. The cams J and O may be mounted on the same shaft or on separate shafts $p$ and $q$, as illustrated in Fig. 3, and are arranged to rotate independently of each other. The cam J is operated to give a relatively slow traverse to the wire-guide $b$ while the cam O is driven at a faster rate to impart a short, quick traverse to the yarn-guides $d$ and $e$. Referring to Fig. 4, the guide $b$ pivots on the traverse-rod $f$ to allow it to swing outwardly from the axis of the tube $x$ as the wire is built up thereon, while the guides $d$ and $e$ are pivoted on the rod $k$ and move back from the tube as the yarn windings increase in diameter. Means, not here shown, are also provided for maintaining the guides bearing on the surface of the winding. It will be understood that the tube $x$ is held on a suitable winding-spindle or mandrel, not here illustrated, which rotates in the direction indicated by the arrow 2, Fig. 4.

Referring to Fig. 3, the wire-guide $b$ traverses along the tube $x$ from $r$ to $s$ to wind the wire layers $l$, see Fig. 2; while the yarn-guide $d$ traverses from $t$ to $r$ and the guide $e$ from $s$ to $u$ to build up the yarn cops or abutments Y and Y'. Any other equivalent arrangement might be used for reciprocating the several guides, and suitable means, not here shown, are provided to control the ratio of speed between the winding-spindle and the guides to effect the proper disposition of both the wire turns and the yarn windings. The size of the yarn or other insulating material used for the end abutments Y, Y' depends on the size of the wire being wound and is determined by the thickness of the several layers required to equal one layer of wire. This proportion is easily found by experiment and usually a fine yarn is employed, the drawings showing its size somewhat exaggerated in order to illustrate the windings more clearly.

From the above explanation it will be understood that my new system of winding enables me to build up a coil with protecting end abutments which take the place of the usual retaining heads or flanges of the spools commonly used for this purpose. The abutments or yarn disks Y, Y' are built up coincident with the building of the coil; that is, with the same ratio of growth or increase in diameter. It will therefore be seen that the guide for the wire can be arranged to bear constantly on the surface on which the windings are being deposited, without interference from the end flanges, and hence the convolutions or turns can be more accurately controlled in relation to each other. This results in a more precise arrangement of the turns of wire in the coil and therefore provides for greater electrical efficiency and less liability of short circuiting or other defects. In addition, the end abutments of the coil are self-conforming, as previously explained, and adapt themselves exactly to the requirements of the wire windings so that an improved supporting and retaining effect is secured. At the same time the completed coil is much more stable and permanent on account of the substantial end abutments which act as a protecting and cushioning means to prevent damage to the windings in handling or when in use.

The end abutments of my improved coil might be wound from materials other than yarn, such as silk thread, similar attenuated fibers, or with narrow, flat tapes. Other modifications might be made in the material or arrangement of the windings, particularly as to variations in dimension and form, without departing from the spirit or scope of the present invention; therefore I do not limit myself to the exact embodiment shown and described.

What I claim herein is:—

1. A coil for electrical purposes composed of a series of layers of conducting material built up with substantially flat ends, and abutments of insulating material wound in the form of disk-like cops and built up adjacent said ends to support and protect the windings of the coil.

2. A coil for electrical purposes comprising a series of layers of conducting material, and windings of insulating material built up adjacent the ends of said layers and disposed with a cross-wind to form self-sustaining disk-like abutments for supporting and protecting the ends of the coil.

3. In a coil for electrical purposes, the combination with a series of layers of wire wound with closely adjacent helices, of two series of layers of yarn wound with a diagonal or cross-wind to build up disk-like cops abutting the ends of the wire layers and serving to support and protect the ends of the coil.

4. An improved method of manufacturing electrical coils consisting in winding wire in layers of adjacent helices and simultaneously winding yarn with a cross-wind in layers abutting the ends of the wire layers to build up self-sustaining and self-conforming disk-like flanges adjacent the ends of the coil.

5. An improved system of winding electrical coils consisting in winding a conducting material on a core, with a traverse of predetermined length and simultaneously winding an insulating material with a diagonal or cross-wind at the ends of the core with a traverse of relatively less length to build up abutments for supporting and protecting the ends of the coil.

6. An improved system of winding electrical coils consisting in winding wire on a core in layers of a given length and at the same time winding yarn with a diagonal or cross-wind at the ends of the wire layers with a relatively short traverse to build up supporting abutments at the ends of the coil coinciding in growth with the growth of the wire windings.

7. An improved system of winding electrical coils consisting in winding wire on a core with a relatively slow traverse and at the same time winding yarn on the core with a diagonal wind having a relatively quick traverse to build up abutments adjacent the ends of the wire layers coincident with the growth in diameter of the latter.

8. An improved system of winding electrical coils consisting in guiding the wire on to the core with a relatively slow traverse and concurrently guiding yarn on to the core with diagonal convolutions having a relatively short, quick traverse at points adjacent both ends of the wire layers to build up supporting and protecting abutments for the ends of the coil.

In testimony whereof I affix my signature in presence of two witnesses.

ERNEST A. DE WOLF.

Witnesses:
　HERBERT E. KING,
　CHARLES N. CRANE.